April 27, 1937.  F. P. BECKER ET AL  2,078,364
DIRECT ACTING SHOCK ABSORBER
Filed Oct. 14, 1935  2 Sheets-Sheet 1

INVENTORS
FREDERICK P. BECKER
JOHN M. NICKELSEN
ARTHUR BOOR
BY
Whittemore Hulbert Whittemore Belknap ATTORNEYS April 27, 1937. F. P. BECKER ET AL 2,078,364
DIRECT ACTING SHOCK ABSORBER
Filed Oct. 14, 1935 2 Sheets-Sheet 2
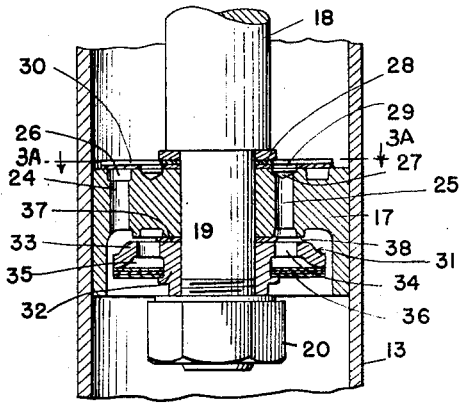
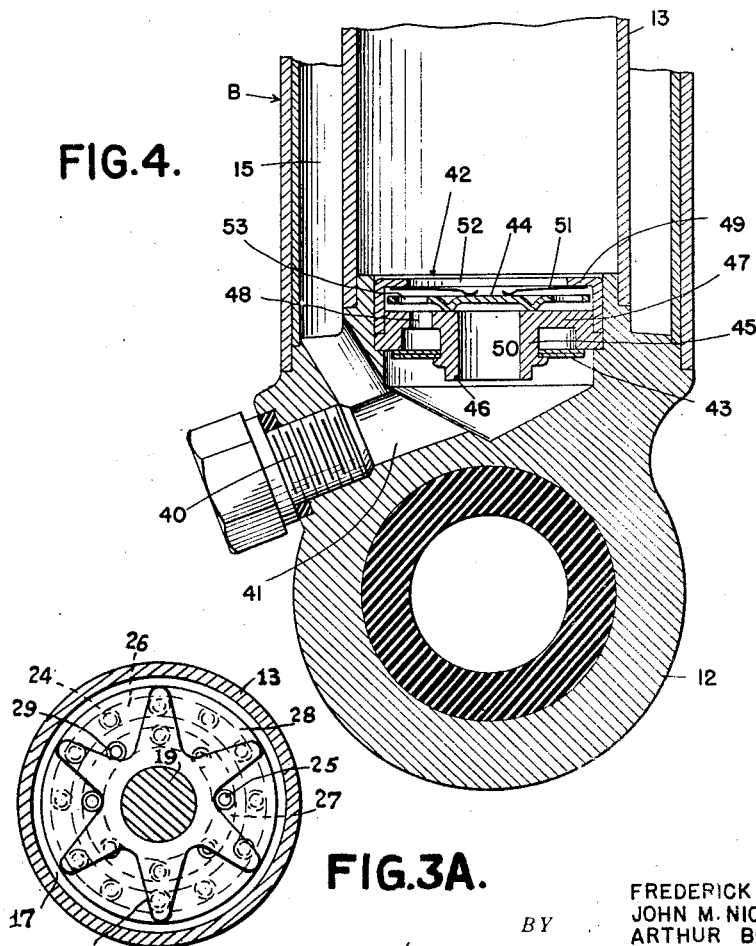
INVENTORS
FREDERICK P. BECKER
JOHN M. NICKELSEN
ARTHUR BOOR
BY
Whittemore Hulbert Whittemore Belknap ATTORNEYS Patented Apr. 27, 1937

2,078,364

UNITED STATES PATENT OFFICE 2,078,364

DIRECT ACTING SHOCK ABSORBER

Frederick P. Becker, Chicago, Ill., John M. Nickelsen, Ann Arbor, Mich., and Arthur Boor, Toledo, Ohio, assignors to Monroe Auto Equipment Company, Monroe, Mich., a corporation of Michigan Application October 14, 1935, Serial No. 44,986

18 Claims. (Cl. 188—88)

This invention relates generally to shock absorbers and refers more particularly to improvements in hydraulic shock absorbers.

The present invention is primarily directed to hydraulic shock absorbers of the direct acting type having a ported piston working in a pressure cylinder in dependence upon relative movement of the parts with which the shock absorber is connected and, in addition, having valve means in association with the piston for regulating the passage of the hydraulic fluid medium through the piston in both directions of movement of the latter in the fluid pressure chamber.

One of the important features of the present invention resides in the provision of means rendering it possible to readily vary the pressure characteristics of the shock absorber without interfering with the valve means, and this is accomplished in the present instance by providing a variable by-pass around the valve permitting relatively free flow of fluid from the portion of the pressure chamber at one side of the piston to the portion of the pressure chamber at the opposite side of the piston.

Another object of the present invention resides in the provision of a pressure relief valve between the pressure chamber and a fluid reserve chamber operable to quickly relieve the pressure on one side of the piston when the latter exceeds a predetermined amount.

Still another advantageous feature of the present invention resides in the novel valve assembly employed in association with the ported piston to control the passage of fluid through the piston in both directions of movement of the latter.

In addition to the foregoing, the present invention contemplates the provision of means for positively limiting the extent of separation of the relatively movable shock absorber parts in the event of failure of the valve assembly to properly retard this movement, or in the event an extremely abnormal shock is encountered by the vehicle.

The foregoing, as well as other objects will be made more apparent as this description proceeds, especially when considered in connection with the accompanying drawings, wherein:

Figure 3 is an enlarged sectional view through the piston;

Figure 3A is a cross sectional view taken substantially on the plane indicated by the line 3A—3A of Figure 3;

Figure 4 is an enlarged sectional view through the lower end portion of the shock absorber shown in Figure 2;

Figure 1:
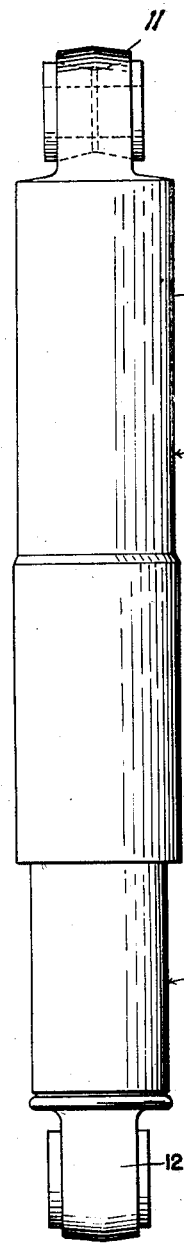
Figure 1 is an elevational view of our improved shock absorber.
Figure 2:
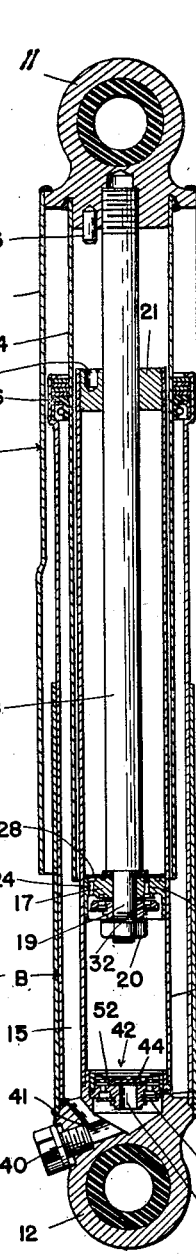
Figure 2 is an enlarged fragmentary longitudinal sectional view taken at right angles to Figure 1.

Referring now more particularly to the embodiment of the invention illustrated in Figures 1 to 4 inclusive, it will be noted that we have illustrated in Figure 2 a shock absorber 10 of the direct acting type comprising two telescoping sections A and B adapted to be directly connected respectively to two relatively movable parts of a vehicle. In the present instance, the section A is adapted to be connected to the sprung weight of the vehicle through the medium of a head 11 forming a closure for the upper end of the section A, and the section B is adapted to be connected to the unsprung weight through the medium of a head 12 forming a closure for the lower end of the section B.

Located within the sections A and B in concentric relation with respect thereto is a pair of telescoping tubular members 13 and 14. The inner tubular member 13 forms the fluid pressure chamber of the shock absorber and is secured at its lower end to the head 12, in such a manner as to form with the section B a fluid reserve chamber 15. The tubular member 14 is secured at its upper end to the head 11 and cooperates with a packing unit 16, carried at the upper end of the section B, to form a seal for the reserve chamber 15. It will, of course, be understood that the packing unit 16 slidably engages the surface of the tubular member 14 so as to permit relative movement of the heads and associated parts toward and away from each other.

The reserve chamber 15 is adapted to contain a reserve supply of hydraulic medium in addition to that in the tubular member or pressure chamber 13, and the medium in the chamber 13 is displaced in dependence upon relative movement of the heads, by means of a piston 17 connected to the upper head 11 for reciprocation in the fluid pressure chamber, by means of a connecting rod 18. As shown in Figure 2, the lower end portion of the rod 18 is reduced as at 19 to extend through the piston 17, and the latter is secured in position against the shoulder formed by the reduced portion, by means of a nut 20 threaded on the extremity of the reduced portion 19. The upper end of the rod is threaded for detachable engagement with the head 11 for movement as a unit with the latter, and a bushing 21 is threaded in the upper end of the fluid pressure chamber to perform the dual function of substantially closing this chamber and of forming a guide for the piston rod. It may also be pointed out at this time that the bushing 21 cooperates with the piston 17 to secure the several telescoping parts of the shock absorber in assembled relationship and that manipulation of the bushing 21 may be readily effected to disassemble the parts by providing one or more recesses 22 in the upper side of the bushing of sufficient dimension to receive a dowel pin 23 extending downwardly from the upper head 11 in a position to register with the recess 22. When it is desired to disassemble the parts of the shock absorber the heads are relatively moved toward each other until the dowel pin 23 on the head 11 engages in the recess 22 in the bushing 21 and then the head 11 is rotated about the axis of the shock absorber in the direction to unscrew the bushing from the pressure chamber.

As previously stated, the fluid medium in the pressure chamber 13 is displaced by the piston 17 and in order to permit this displacement of the fluid medium, the piston is provided with two series of ports designated generally herein by the reference characters 24 and 25 as shown particularly in Figure 3. The passage of fluid through the ports in the piston is controlled by a valve assembly having valve members so arranged that when the piston 17 is moved relative to the fluid pressure chamber in a direction toward the upper closure 21, fluid in the pressure chamber above the piston is permitted to flow downwardly through the inner series of openings 25 to the portion of the pressure chamber below the piston and when the latter is moved in a downward direction toward the lower head 12, fluid medium in the pressure chamber below the piston is transferred through the outer series of openings 24 to the portion of the fluid pressure chamber above the piston. In detail, the upper ends of the two series of passages respectively discharge into noncommunicating annular recesses 26 and 27 formed in the top face of the piston. The recess 26, or the discharge ends of the outer series of passages 24 through the piston, are normally closed by a resilient disk valve or disk 28 seated upon the top surface of the piston and having slots 29 communicating with the recess 27, so as not to obstruct the inner series of passages 25. The disk valve 28 is rigidly secured at its center on the reduced portion 19 of the connecting rod 18 between the shoulder formed by this reduced portion and the piston. The free peripheral portion of the disk 28 is yieldably urged against the piston and in seating relationship with the annular recess 26, by means of a suitable spring element 30 also rigidly secured on the reduced portion 19 of the connecting rod. Thus, it will be apparent that the fluid medium flowing upwardly through the passages 24 in the piston upon downward movement of the latter must flex the peripheral portion of the resilient disk 28 away from the piston against the action of the spring 30 before the fluid is permitted to pass into the portion of the pressure chamber above the piston, with the result that the flow of the medium is definitely retarded.

In order to properly control the rebound action of the shock absorber, it is desirable to restrict, to a greater extent, the flow of the hydraulic medium from the portion of the pressure chamber above the piston 17 to the portion below the piston. This is accomplished in the present instance by predetermining the cross-sectional area of the passages 25, and by providing a stronger valve member for controlling the passage of fluid medium downwardly through these passages. The valve unit for accomplishing this result is designated herein by the reference character 31 and comprises a body 32 secured upon the reduced portion 19 of the connecting rod between the underside of the piston 17 and the nut 20. As is shown in Figure 3, the valve body is provided with a laterally extending flange 33 at the upper end thereof having openings 34 therethrough registering with the passages 25 and having the peripheral portion offset downwardly from the plane of the flange to form an annular recess 35 in communication with the openings 34. The lower side of the recess is normally closed by a laminated spring valve 36 comprising a plurality of disks sleeved upon the valve body and secured to the latter with the peripheral portion of the uppermost disk seating upon the periphery of the offset portion of the flange 33. In the present instance, the laminated valve 36 is considerably stronger than the resilient valve member 28, previously referred to as controlling the flow of hydraulic fluid medium upwardly through the passages 24 in the piston, and, accordingly, the flow of hydraulic fluid medium downwardly through the passages 35 is restricted to a greater extent.

It will, of course, be understood from the foregoing that the pressure characteristics of the shock absorber will depend largely upon the degree of restriction of the flow of hydraulic medium through the piston, and in order to permit controlling the pressure characteristics of the shock absorber, we provide a permanent bleed or by-pass through the piston. The bleed is effective principally to by-pass fluid medium around the valve 36 upon upward movement of the piston 17, although it will also operate to permit a limited amount of fluid medium to flow upwardly through the inner series of passages 25 upon downward movement of the piston. In detail, the bleed or by-pass is effected by interposing a washer of predetermined thickness between the upper end of the valve body 32 and the lower side of the piston 17. As shown in Figure 3, the washer 37 provides a clearance 38 between the lower ends of the passages 25 and communicating openings 34 sufficient to permit hydraulic fluid medium flowing downwardly through the passages 25 around the valve 31. It will be apparent that the quantity of fluid medium by-passed will depend upon the amount of clearance, and the latter in turn depends upon the thickness of the washer. Thus, by employing washers having different thicknesses, the quantity of fluid medium by-passed may be varied and, as a consequence, the pressure characteristics of the shock absorber changed to conform to the specifications required.

Assuming that the reserve chamber 15 and the fluid pressure chamber have been filled with a hydraulic fluid medium through the filler opening 40, it will be noted that some provision must be made for the volume of fluid medium in the pressure chamber displaced by the piston rod 18. In other words, the cross-sectional area of the available space for fluid in the pressure chamber 13 above the piston 17 is less than the cross-sectional area of the space below the piston by an amount equal to the cross-sectional area of the piston rod 18. Consequently, it is necessary to provide some means to receive the excess fluid created in the pressure chamber below the piston 17 upon downward movement of the latter, and to supply the additional fluid required upon upward movement of the piston. Figure 4 shows the foregoing is accomplished in the present instance by establishing communication between the lower end of the reserve chamber 15 and the corresponding end of the pressure chamber 13 through the medium of a passage 41. The flow of fluid through the passage 41 is controlled by means of a valve assembly 42 having a valve 43 of the resilient laminated disk type for controlling the flow of fluid from the pressure chamber to the reserve chamber upon downward movement of the piston 17, and having a check valve 44 for controlling the flow of fluid from the reserve chamber to the pressure chamber. In detail, the resilient valve 43 is carried by the hub 45 of a bushing 46 located within the lower end of the pressure chamber and having a radially extending flange 47 provided with openings 48 therethrough. As will be observed from Figure 4, the resilient valve 43 is so located with respect to the openings 48 as to prevent the flow of fluid from the reserve chamber upwardly through the openings, but to permit the reverse flow of the fluid in the event the pressure in the chamber 13 below the piston exceeds that required to operate the resilient valve. It will also be apparent from Figure 4, that the check valve 44 is positioned above the bushing in a cage 49 and normally closes communication through the central opening 50 of the bushing. The check valve is normally urged in its closed position by means of relatively weak spring members 51 secured within the cage 49. The cage is apertured as at 52 to permit the free flow of fluid therethrough, and the peripheral portions of the check valve are also apertured as at 53 so as to provide for unrestricted passage of the fluid flowing upwardly through the opening 50.

*Operation*

In operation, when the piston 17 travels downwardly or, in other words, when the heads 11 and 12 move toward one another, the fluid below the piston flows upwardly through the outer series of passages 24 in the piston, and the pressure of this fluid unseats the resilient valve member 28 and permits the fluid to pass into the portion of the pressure chamber above the piston. Inasmuch as the available space for fluid above the piston is less in volume than the space below the piston, due to the rod 18, sufficient pressure is built up in the pressure chamber below the piston to unseat the check valve 43 and permit the excess fluid to flow into the reserve chamber 15. On the return movement, that is when the piston is moved upwardly, as viewed in Figure 2, the disk valve 28 seats and the fluid passes from the upper end of the pressure chamber 13 downwardly through the passages 25 in the piston, and the pressure of this fluid unseats the laminated disk valve 36 so as to permit the fluid to pass into the lower end of the pressure chamber. In the present instance, the laminated disk valve 36 is stronger than the disk valve 28 so as to offer a greater resistance to the passage of fluid upon the rebound or upward movement of the piston. Thus, it will be observed that the pressure characteristics of the shock absorber depend to a great extent upon the restriction offered to the passage of fluid through the piston and, in the present instance, the degree of restriction is controlled by the by-pass 38 operable to permit a certain quantity of the fluid to flow through the piston without interference by the disk valves. As previously stated, the quantity of fluid by-passed may be readily varied without interfering with either of the disk valves, by merely increasing or decreasing the thickness of the shim 37.

Owing to the presence of the rod 18 in the upper end of the pressure cylinder, the quantity of fluid passed from the upper end of the pressure chamber through the piston to the lower end is less than actually required to fill the lower end, and, accordingly, the check valve 44 is opened upon upward movement of the piston to permit the relatively free flow of the desired quantity of fluid from the reserve chamber to the lower end of the pressure chamber.

Figure 5:
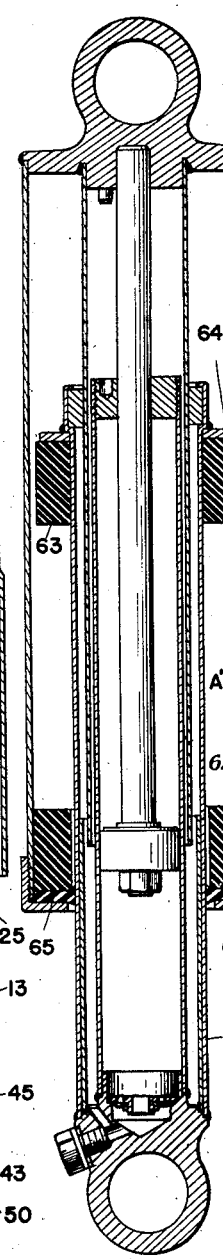
Figure 5 is a view similar to Figure 2, showing a slightly modified form of construction.

The embodiment of the invention illustrated in Figure 5 differs from the one previously described in that means is provided for yieldably limiting the extent of rebound movement of the shock absorber, or the extent of relative movement of the heads in directions away from each other. As shown in Figure 5, an annular block 60 formed of a compressible material is located within the lower end of the tubular section A' of the shock absorber and is secured within a cup-shaped member 61 threaded upon the lower end of the section A', by means of suitable projections 62 bent inwardly from the tubular section A' to engage the top of the block. Thus, it will be observed that the annular block 60 moves as a unit with the upper head 11 and is adapted to engage a cooperating annular block 63 surrounding the tubular section B' and secured to the upper end thereof through the medium of a collar 64. The relative positions of the two blocks is such as not to interfere with the normal operation of the shock absorber, but to engage each other only when the rebound action of the shock absorber becomes extremely abnormal.

The foregoing construction renders it possible to provide a relatively simple seal between the tubular section A' and the tubular section B'. As shown in Figure 5, this seal may be effected by locating a pliable washer 65 between the lower end of the annular block 60 and the base of the cup-shaped member 61. The width of the washer is, of course, sufficient to permit the inner edge thereof to frictionally engage the tubular member B'.

Figure 6:
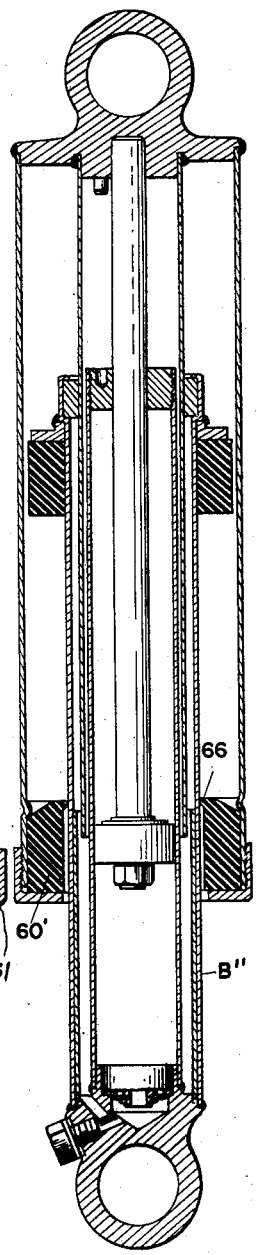
Figure 6 is a view similar to Figure 5 featuring still a further modified form of construction.

The modification featured in Figure 6 differs from the one shown in Figure 5 in that the washer 65 may be eliminated and the function of this washer performed by forming a lip 66 at the upper end of the block 60' in a position to frictionally engage the inner tubular section B''.

While the embodiment of the invention herein illustrated and described somewhat in detail has been found in practice to give entirely satisfactory results, nevertheless, various changes and modifications may suggest themselves to those skilled in this art, and to this end reservation is made to make such changes as may come within the purview of the accompanying claims.

What we claim as our invention is:

1. In a shock absorber of the direct acting type, a pair of concentric spaced tubular members closed at their lower ends and forming an inner pressure cylinder and an outer reserve chamber, a piston operable in said cylinder and provided with a port therethrough, a flexible disk secured at its center on said piston and having its peripheral portion capable of flexing for controlling said port, a resilient member centrally secured on the piston in superposed relation to the disk for yieldably holding the periphery of said disk in position to close said port, a port connecting the cylinder and reserve chamber, and a valve device differentially controlling the flow of fluid through said port in opposite directions.

2. In a shock absorber of the direct acting type, a pair of concentric spaced tubular members closed at their lower ends and forming an inner pressure cylinder and an outer reserve chamber, a sealing tube closed at its upper end and telescoping between said spaced tubular members, a piston operable in said cylinder and provided with a port therethrough, a resilient disk valve rigidly secured at its center on said piston and seated on the piston with the peripheral portion thereof capable of flexing for controlling said port, a resilient member centrally secured to said piston in superposed relation to the disk valve for yieldably holding the periphery of said disk valve in position to close said port, a port connecting the cylinder and reserve chamber, and a valve device differentially controlling the flow of fluid through the port in opposite directions.

3. In a shock absorber of the direct acting type for vehicles having relatively movable parts, a pair of concentric spaced tubular members having the opposite ends respectively connected to the relatively movable parts of the vehicle, one of said tubular members forming a pressure cylinder, a piston operable in said cylinder and provided with a port therethrough, a resilient disk fixed at its center with respect to said piston and having its peripheral portion capable of flexing movement away from said piston for controlling said port, and a resilient member centrally secured on the piston in superposed relation to said disk for yieldably holding the peripheral portion of the disk in position to close said port.

4. In a shock absorber of the direct acting type, a cylinder, a piston rod having a reduced portion forming a shoulder, a ported piston on the reduced portion of said piston rod, a flexible disk rigidly secured at its central portion on the reduced portion of the rod between the piston and shoulder with its peripheral portion free to flex for controlling the port of the piston, and a spring element centrally secured on said reduced portion between the disk and shoulder for yieldably urging the peripheral portion of said disk in closed position.

5. In a shock absorber of the direct acting type for vehicles having relatively movable parts, a pair of concentric spaced tubular members having the opposite ends respectively connected to the relatively movable parts, one of the tubular members forming a pressure cylinder, a piston rod movable with one of the tubular members and extending into the pressure cylinder, said rod having a reduced portion forming a shoulder, a ported piston on the reduced portion of the piston rod, a resilient disk rigidly centrally secured on the reduced portion of the rod between the piston and shoulder with its peripheral portion free to flex to control the port of said piston, and a spring element centrally secured on said reduced portion between the disk and shoulder for yieldably urging the peripheral portion of the disk into closed position.

6. In a shock absorber of the direct acting type, a cylinder, a piston rod having a reduced portion forming a shoulder, a ported piston on the reduced portion of said piston rod, a flexible resilient disk rigidly secured centrally thereof on the reduced portion of the rod between the piston and said shoulder and having a free peripheral portion for controlling the port of said piston, a spring element centrally secured on said reduced portion between said disk and shoulder for yieldably urging the peripheral portion of said disk into closed position, and a washer engaging said shoulder and providing a backing surface for the spring element.

7. In a shock absorber of the direct acting type, a cylinder, a ported piston operable in said cylinder, valve means associated with said piston for controlling the flow of fluid through the piston port, and a disk-like member of predetermined thickness arranged between said piston and valve means providing a bleed opening of selected capacity.

8. In a shock absorber of the direct acting type for vehicles having relatively movable parts, a pair of concentric tubular members having the opposite ends respectively connected to the relatively movable parts of the vehicle, one of said tubular members forming a pressure cylinder, a ported piston movable with one of the tubular members and operable in said cylinder, valve means associated with said piston for controlling the flow of fluid through the piston port, and a disk-like member of predetermined thickness located between said piston and valve means providing a bleed opening of selected capacity.

9. In a shock absorber of the direct acting type, a pair of concentric spaced tubular members closed at their lower ends and forming an inner pressure cylinder and an outer reserve chamber, a ported piston operable in the cylinder, valve means associated with said piston for differentially controlling the flow of fluid through the piston ports in opposite directions, a disk-like member of predetermined thickness associated with said valve means providing a permanent bleed opening of selected capacity, a port connecting the cylinder and reserve chamber, and a valve device differentially controlling the flow of fluid through said port in opposite directions.

10. In a shock absorber of the direct acting type, a pair of concentric tubular members closed at their lower ends and forming an inner pressure cylinder and an outer reserve chamber, a sealing tube closed at its upper end and telescoping between the spaced tubular members, a ported piston operable in said cylinder, valve means associated with the piston for controlling the flow of fluid through the piston port, a disk-like member of predetermined thickness associated with said valve means and providing a permanent bleed opening of selected capacity, a port establishing communication between the pressure cylinder and reserve chamber, and a valve device differentially controlling the flow of fluid through the last named port in opposite directions.

11. In a hydraulic shock absorber, a pair of concentric spaced tubular members forming an inner pressure cylinder and an outer reserve chamber, a piston operable in said cylinder and provided with ports therethrough, a resilient disk rigidly secured at its center and seated on said piston for controlling the flow of fluid through one of said ports in one direction, a resilient member rigidly secured at its center in superposed relation to said disk for yieldably urging the periphery of said disk in position to close said port, a valve associated with said piston for controlling the flow of fluid through another of said ports in the opposite direction, and a disklike member of predetermined thickness arranged between said piston and last-named valve providing a permanent bleed opening of selected capacity.

12. In a hydraulic shock absorber, a housing providing a cylinder and a reserve chamber, a piston operable in said cylinder and provided with ports therethrough, a resilient disk fixed at its center with respect to said piston and having its peripheral portion capable of flexing movement away from said piston thereby providing pressure actuated means for controlling the flow of fluid through one of said ports in one direction, and valve means associated with said piston for controlling the flow of fluid through another of said ports in the opposite direction comprising a resilient disk rigidly secured at its center with respect to said piston and with its periphery capable of flexing movement under predetermined pressure in a direction away from the piston.

13. In a hydraulic shock absorber, a housing provided with a cylinder and a reserve chamber communicating with the cylinder, a valved piston operable in the cylinder to force fluid from the cylinder into the reserve chamber upon movement in one direction, a check valve controlling communication between the cylinder and reserve chamber comprising a member provided with ports therethrough establishing communication between the cylinder and reserve chamber, valve means for one of the ports preventing the flow of fluid through said port from the reserve chamber to the cylinder and comprising a resilient disk fixed at its center with respect to said member and having the peripheral portion capable of flexing movement under pressure of the fluid away from the member when the piston is moved in the first named direction, and valve means for the other port preventing the flow of fluid therethrough from the cylinder to the reserve chamber and effective upon movement of the piston in the opposite direction to permit the return of fluid from the reserve chamber to the cylinder.

14. In a hydraulic shock absorber, a housing provided with a cylinder and a reserve chamber communicating with the cylinder, a piston having ports therethrough and operable in the cylinder to force fluid from the cylinder into the reserve chamber upon movement thereof in one direction, valve means associated with said piston and effective upon movement of the latter in opposite directions to differentially control the flow of fluid through the piston ports, means controlling communication between the cylinder and reserve chamber comprising a member provided with ports therethrough establishing communication between the cylinder and reserve chamber, valve means for one of the ports preventing the flow of fluid through said port from the reserve chamber to the cylinder and comprising a resilient disk fixed at its center with respect to the member and having the peripheral portion extending over said port and capable of flexing movement under pressure of the fluid away from the member when the piston is moved in the first named direction, and valve means for the other port preventing the flow of fluid through this port from the cylinder to the reserve chamber and effective upon movement of the piston in the opposite direction to permit relatively free flow of fluid from the reserve chamber to the cylinder.

15. In a hydraulic shock absorber, a housing provided with a cylinder and a reserve chamber communicating with the cylinder, a piston having a port therethrough and operable in the cylinder to force fluid from the cylinder into the reserve chamber upon movement thereof in one direction, valve means associated with the port through the piston and operable upon movement of said piston in the direction aforesaid to permit relatively free flow of fluid through the piston, means controlling communication between the cylinder and reserve chamber comprising a member provided with ports therethrough establishing communication between the cylinder and reserve chamber, valve means for one of the ports preventing the flow of fluid through said port from the reserve chamber to the cylinder upon movement of the piston in a direction opposite the direction of movement aforesaid and comprising a resilient disk fixed at its center with respect to said member and having the peripheral portion extending over said port and capable of flexing movement under pressure of the fluid away from the member when the piston is moved in the first named direction, and valve means for the other port through said member preventing the flow of fluid therethrough from the cylinder to the reserve chamber and effective upon movement of the piston in the second mentioned direction to permit the flow of fluid from the reserve chamber to the cylinder.

16. In a hydraulic shock absorber, a housing provided with a cylinder and a reserve chamber communicating with the cylinder, a piston operable in the cylinder to force fluid from the cylinder into the reserve chamber upon movement thereof in one direction, means controlling communication between the cylinder and reserve chamber comprising a member provided with a port therethrough establishing communication between the cylinder and reserve chamber and having a recess at one side of the port to receive fluid flowing through said port, valve means for the port preventing the flow of fluid through said port from the reserve chamber to the cylinder and comprising a resilient disk fixed at its center with respect to said member and having the peripheral portion seated against the valve member beyond the recess and capable of flexing movement under the pressure of the fluid in the recess away from the member when the piston is moved in the direction aforesaid, said member having another port therethrough establishing communication between the reserve chamber and cylinder, and valve means for the second port preventing the flow of fluid therethrough from the cylinder to the reserve chamber and effective upon movement of the piston in the opposite direction to permit the return of fluid from the reserve chamber to the cylinder.

17. In a hydraulic shock absorber, a housing provided with a cylinder and a reserve chamber communicating with the cylinder, a piston having ports therethrough and operable in said cylinder to force fluid from the cylinder into the reserve chamber upon movement in one direction, valve means associated with the piston and providing relatively free flow of fluid through one of the ports in the piston when the latter is moved in the aforesaid direction, said valve means closing said port upon movement of the piston in the opposite direction, additional valve means associated with the piston and closing the other port in the piston upon movement of the latter in the first named direction, said second valve means affording restricted flow of fluid through the piston upon movement of the latter in the first named direction, a check valve controlling communication between the cylinder and reserve chamber comprising a member provided with ports therethrough establishing communication between the cylinder and reserve chamber, valve means for one of the ports preventing the flow of fluid through said port from the reserve chamber to the cylinder and comprising a resilient disk fixed at its center with respect to said member and having the peripheral portion capable of flexing movement under pressure of the fluid away from the member when the piston is moved in the first named direction, and valve means for the other port through the member preventing the flow of fluid through this port from the cylinder to the reserve chamber and effective upon movement of the piston in the second named direction to permit relatively free flow of fluid from the reserve chamber to the cylinder.

18. In a hydraulic shock absorber, a housing providing a cylinder and a reserve chamber, a piston operable in the cylinder and provided with ports therethrough, valve means associated with the piston for controlling the flow of fluid through one of the ports when the piston is moved in one direction, and additional valve means associated with the piston for controlling the flow of fluid through another of the ports in the opposite direction comprising a resilient disk rigidly secured at its center with respect to said piston and having its periphery capable of flexing movement under predetermined pressure in a direction away from the piston.

JOHN M. NICKELSEN.
ARTHUR BOOR.
FREDERICK P. BECKER.